(12) United States Patent
Maehara

(10) Patent No.: US 7,954,389 B2
(45) Date of Patent: Jun. 7, 2011

(54) TORQUE SENSOR AND MANUFACTURING METHOD THEREOF

(75) Inventor: Hideo Maehara, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 213 days.

(21) Appl. No.: 12/385,049

(22) Filed: Mar. 30, 2009

(65) Prior Publication Data

US 2009/0241693 A1    Oct. 1, 2009

(30) Foreign Application Priority Data

Mar. 31, 2008 (JP) ................................. 2008-091838

(51) Int. Cl.
*G01L 3/02* (2006.01)
(52) U.S. Cl. .............................. 73/862.333; 73/862.331
(58) Field of Classification Search ........ 73/862.331–862.333
See application file for complete search history.

(56) References Cited

U.S. PATENT DOCUMENTS

| 6,330,833 B1* | 12/2001 | Opie et al. ............... 73/862.333 |
| 6,367,337 B1* | 4/2002 | Schlabach ................ 73/862.331 |
| 2003/0167857 A1* | 9/2003 | Sugimura et al. ........ 73/862.333 |
| 2003/0233889 A1* | 12/2003 | Nakane et al. ........... 73/862.331 |
| 2007/0169569 A1 | 7/2007 | Osuka et al. |
| 2009/0241692 A1* | 10/2009 | Maehara ................. 73/862.333 |

FOREIGN PATENT DOCUMENTS

JP       2007-240496        9/2007

* cited by examiner

*Primary Examiner* — Max Noori
(74) *Attorney, Agent, or Firm* — Rabin & Berdo, PC

(57) ABSTRACT

A torque sensor (50) comprises a magnetic collecting ring (91, 92) fitted into an annular groove (31, 32) formed on the inner periphery (38) of a housing (30). By providing a staking part (33, 34) on the inner periphery (38) of the housing (30) in the vicinity of the annular groove (31, 32) using a staking device (100), the magnetic collecting ring (91, 92) can be secured in the annular groove (31, 32) through a simple process.

10 Claims, 11 Drawing Sheets

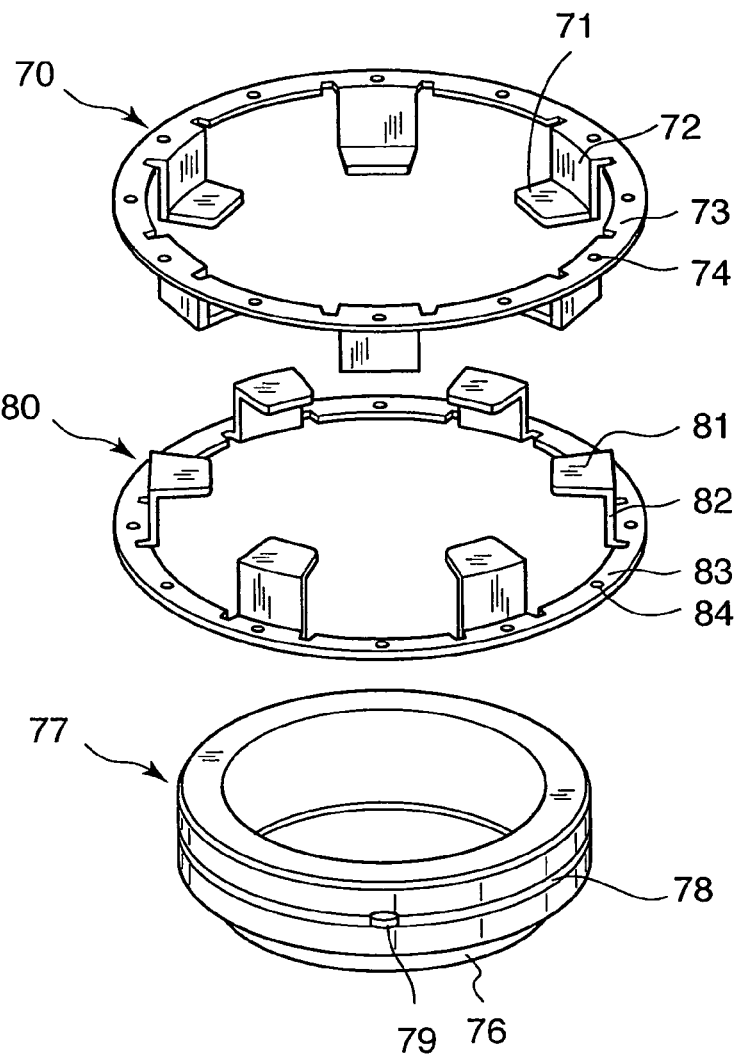
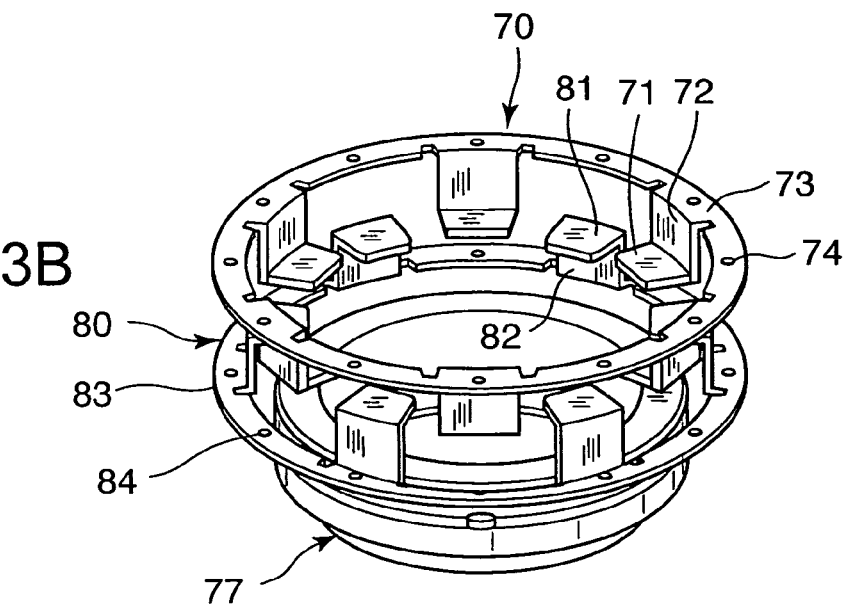

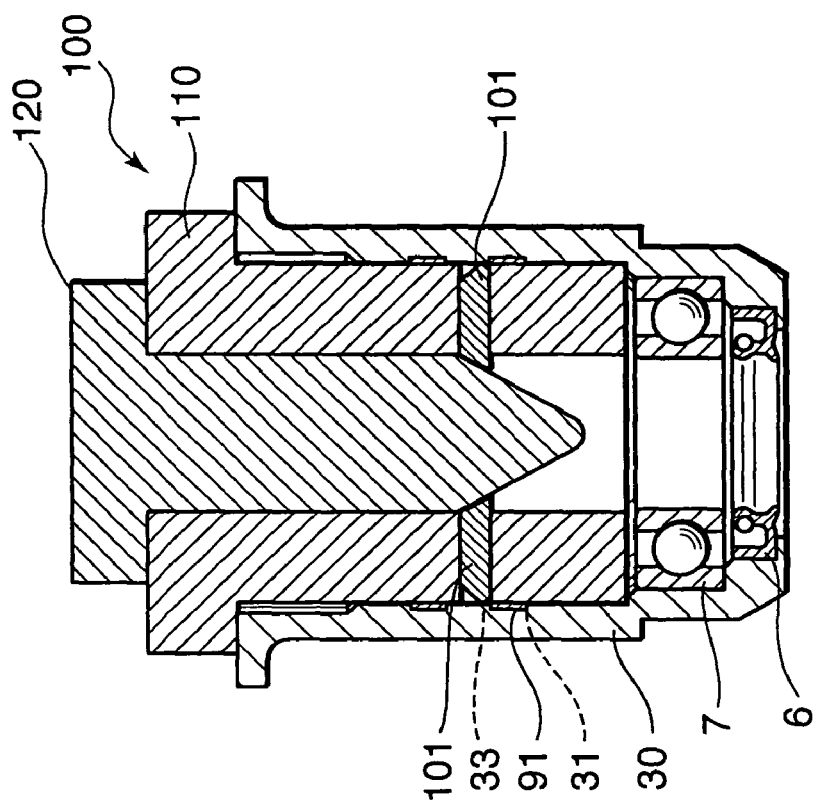
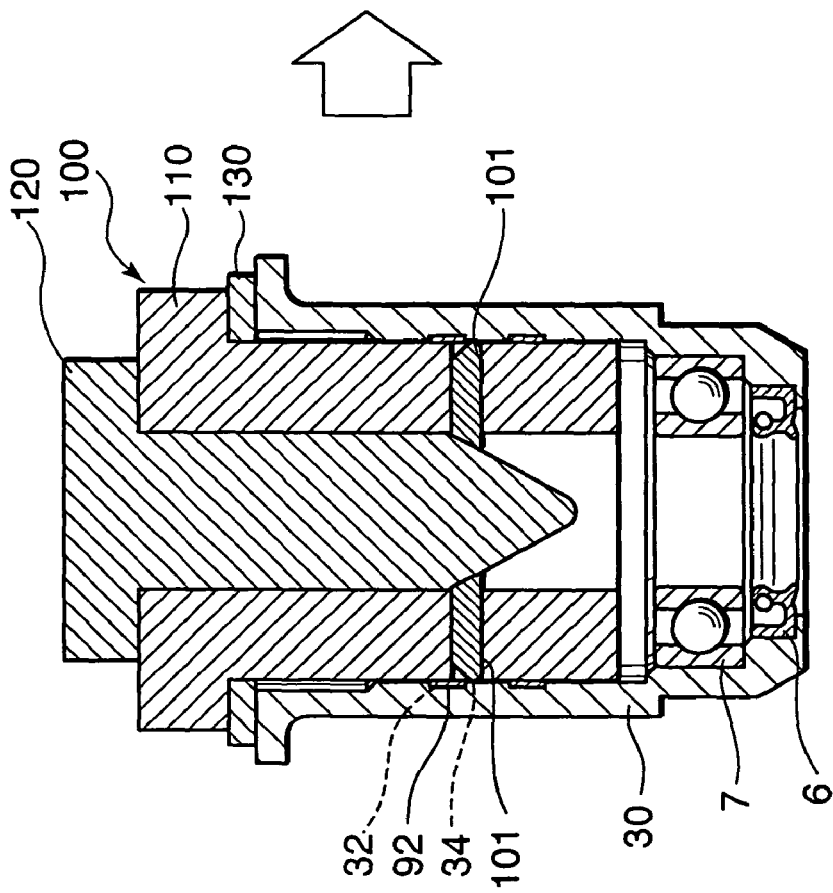

TORQUE SENSOR AND MANUFACTURING METHOD THEREOF

FIELD OF THE INVENTION

This invention relates to a torque sensor for detecting a torque acting on a rotating body without contact and a manufacturing method thereof.

BACKGROUND OF THE INVENTION

JP 2007-240496 A published by the Japan Patent Office in 2007 discloses a torque sensor for a steering system of a vehicle. The torque sensor detects a steering torque input into a torsion bar without contact.

The torque sensor comprises a magnetic force generating part that rotates together with a base of the torsion bar when the torsion bar is operated to rotate, a rotating magnetic circuit which rotates together with an output shaft connected to a tip of the torsion bar, a fixed magnetic circuit fixed to a housing, and a magnetic sensor which detects a magnetic flux density in the fixed magnetic circuit.

As the torsion bar undergoes a torsional deformation due to an input torque, the magnetic force generating part rotates relative to the rotating magnetic circuit, and the magnetic flux density which the rotating magnetic circuit receives from the magnetic force generating part varies.

The rotating magnetic circuit and the fixed magnetic circuit are configured to transmit magnetic flux therebetween without contact. By detecting the density of the magnetic flux in the fixed magnetic circuit using the magnetic sensor, it is possible to detect a torque acting on the torsion bar.

To transmit the magnetic flux from the rotating magnetic circuit to the fixed magnetic circuit, the rotating magnetic circuit comprises a pair of soft magnetic rings. The fixed magnetic circuit comprises a pair of magnetic collecting rings fixed to the inner peripheral surface of the housing.

One of the magnetic collecting rings permanently faces the outer peripheral part of one of the soft magnetic rings. The other magnetic collecting ring permanently faces the outer peripheral part of the other soft magnetic ring. According to this arrangement, when the magnetic collecting ring rotates relative to the corresponding soft magnetic ring, the density of the magnetic flux transmitted from the soft magnetic ring to the magnetic collecting ring does not vary. By providing such a magnetic flux transmission mechanism, the magnetic sensor can detect the torque acting on the torsion bar without contact.

SUMMARY OF THE INVENTION

In this torque sensor, the magnetic collecting ring is formed into a resilient C-shaped ring and fitted into an annular groove formed in the inner peripheral surface of a resin housing. According to this fitting structure of the magnetic collecting ring, however, it is difficult to secure the magnetic collecting ring firmly in the annular groove due to a fitting clearance that is required between the magnetic collecting ring and the annular groove to fit the magnetic collecting ring into the annular groove.

It is also possible to press-fit the magnetic collecting ring into the annular groove of the housing, but internal stress generated in the magnetic collecting ring by the press-fitting adversely affects the magnetic flux collecting performance of the magnetic collecting ring.

It is therefore an object of this invention to secure the magnetic collecting ring firmly in the annular groove without causing the magnetic flux collecting performance of the magnetic collecting ring to deteriorate.

To achieve the above object, this invention provides a torque sensor comprising a housing having an inner peripheral surface, a torsion bar inserted into the housing and having a rotation axis, a magnetic force generating part which rotates together with an end of the torsion bar while generating a magnetic flux in a direction of the rotation axis, a rotating magnetic circuit which rotates together with another end of the torsion bar, a magnetic collecting ring fitted into an annular groove formed on the inner peripheral surface of the housing to surround the rotating magnetic circuit, and a magnetic sensor which detects a magnetic flux density in the magnetic collecting ring.

The rotating magnetic circuit transmits the magnetic flux generated by the magnetic force generating part to the magnetic collecting ring in accordance with a relative rotation positions of the magnetic force generating part and the rotating magnetic circuit.

The torque sensor further comprises a staking part formed on the inner peripheral surface of the housing in the vicinity of the annular groove so as to fix the magnetic collecting ring into the annular groove.

This invention also provides a manufacturing method of the torque sensor described above. The method comprises forming an annular groove on the inner peripheral surface of the housing in the vicinity of the rotating magnetic circuit, fitting the magnetic collecting ring into the annular groove, and forming a staking part on the inner peripheral surface of the housing in the vicinity of the annular groove to fix the magnetic collecting ring into the annular groove.

The details as well as other features and advantages of this invention are set forth in the remainder of the specification and are shown in the accompanying drawings.

BRIEF DESCRIPTION OF THE DRAWINGS

FIGS. 3A and 3B are perspective views of a rotating magnetic circuit according to this invention in a broken-down state and a built-up state.

FIGS. 10A and 10B are vertical sectional views of the staking device, illustrating an operation of the staking device.

DESCRIPTION OF THE PREFERRED EMBODIMENTS

Figure 1:
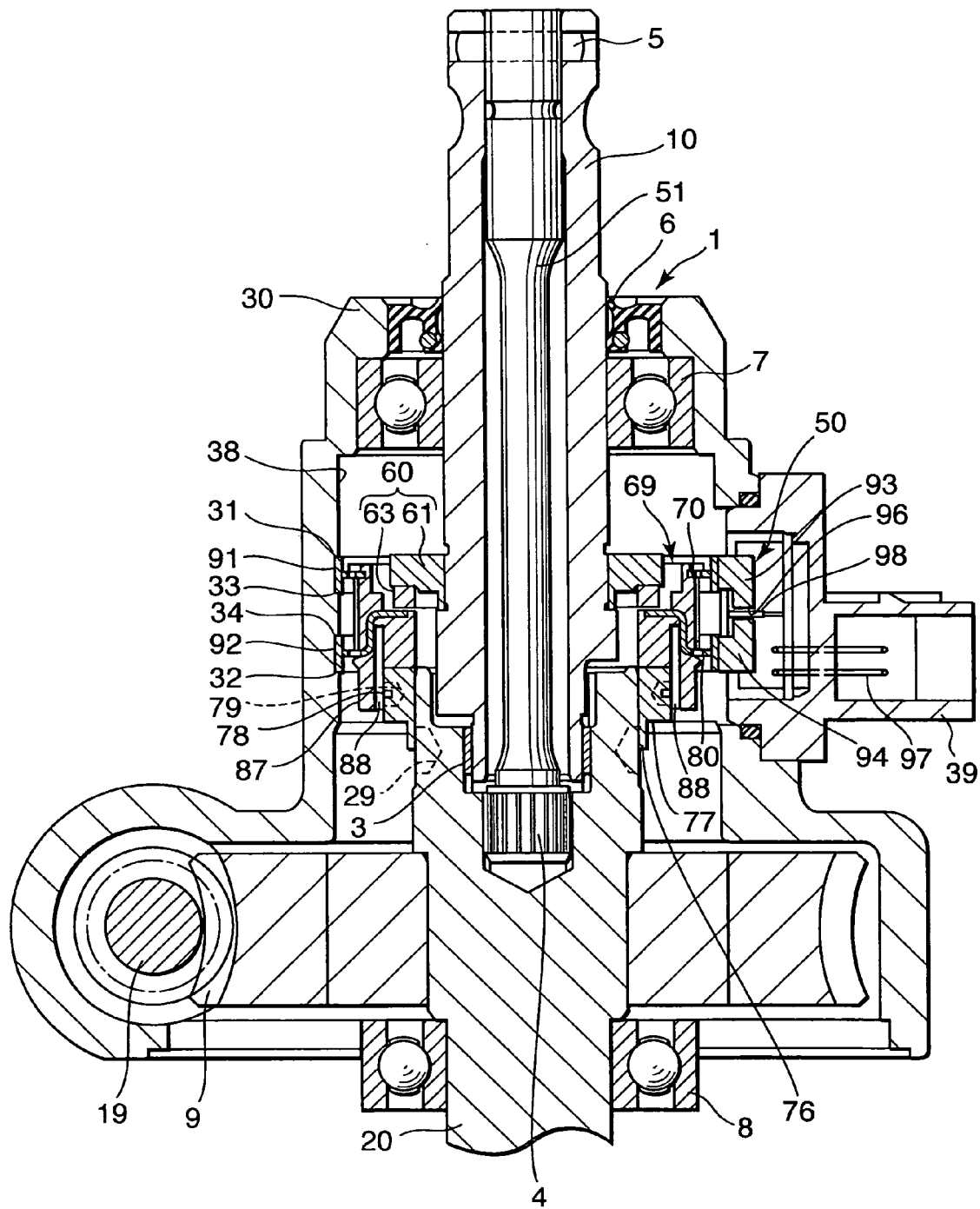
FIG. 1 is a longitudinal sectional view of a power steering device comprising a torque sensor according to this invention.

Referring to FIG. 1 of the drawings, a power steering device 1 for a vehicle transmits an input torque that is input into the input shaft 10 from a steering wheel of the vehicle to an output shaft 20 via a torsion bar 51. The rotational torque of the output shaft 20 is then transmitted to a steered wheel via a rack-and-pinion mechanism.

The power steering device 1 comprises an assisting mechanism using an electric motor to assist a steering operation. The assisting mechanism comprises a worm wheel 9 fixed onto the outer periphery of the output shaft 20 and a worm 19 engaging with the worm wheel 9. The electric motor drives the worm 19 to rotate such that an auxiliary torque is input into the output shaft 20 in a direction of the steering operation.

To cause the assisting mechanism to generate the auxiliary torque corresponding to the input torque input into the input shaft 10 when the steering wheel is operated, the power steering device 1 comprises a torque sensor 50 which detects the input torque input into the input shaft 10. By controlling a power current driving the electric motor on the basis of a detected torque detected by the torque sensor 50, an auxiliary torque proportional to the input torque can be exerted on the output shaft.

The input shaft 10 is supported by a housing 30 via a ball bearing 7 so as to be free to rotate. The input shaft 10 is formed to have an axial hollow portion. The torsion bar 51 is accommodated in the axial hollow portion of the input shaft 10. A base of the torsion bar 51 is fixed to the input shaft 10 using a pin 5 while a tip of the torsion bar 51 engages with the output shaft 20 via a serration 4.

A dust seal 6 is interposed between the housing 30 and the input shaft 10. The output shaft 20 is supported by the housing 30 via a ball bearing 8 so as to be free to rotate. An outer periphery of a lower end of the input shaft 10 is supported by the output shaft 20 via a slide bearing 3.

In the structure described above, the input shaft 10 and the output shaft 20 can rotate relatively about an identical rotation axis within a torsional deformation range of the torsion bar 51.

Figure 2:
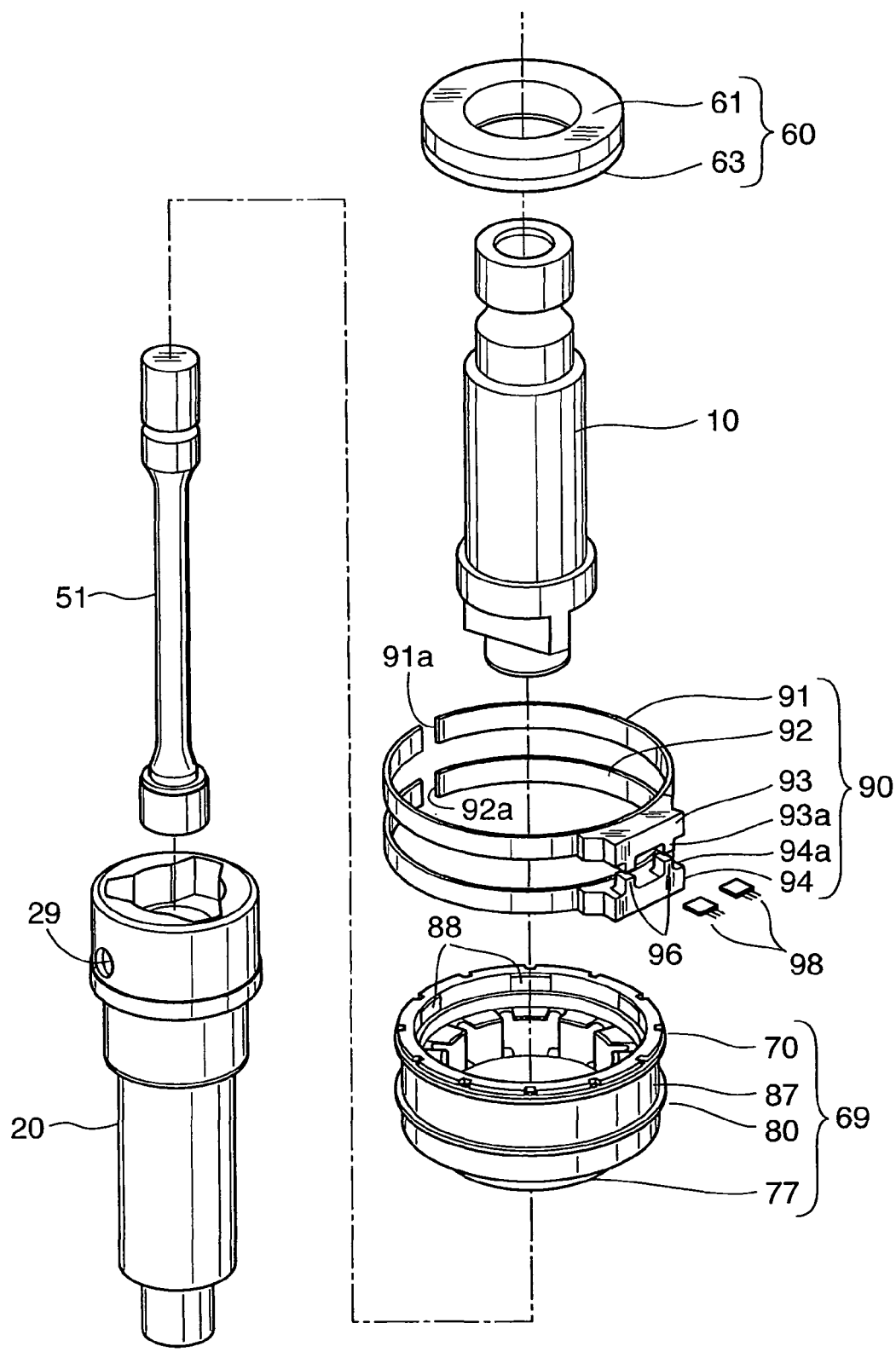
FIG. 2 is an exploded perspective view of essential parts of the power steering device including the torque sensor.

Referring to FIG. 2, the torque sensor 50 comprises a magnetic force generating part 60 which rotates together with the input shaft 10, a rotating magnetic circuit 69 which rotates together with the output shaft 20, a fixed magnetic circuit 90 fixed to the housing 30, and a magnetic sensor 98 which detects a magnetic flux density in the fixed magnetic circuit 90.

The magnetic force generating part 60 comprises a magnet ring 63 fixed onto the input shaft 10 via a back yoke 61.

Figure 4:
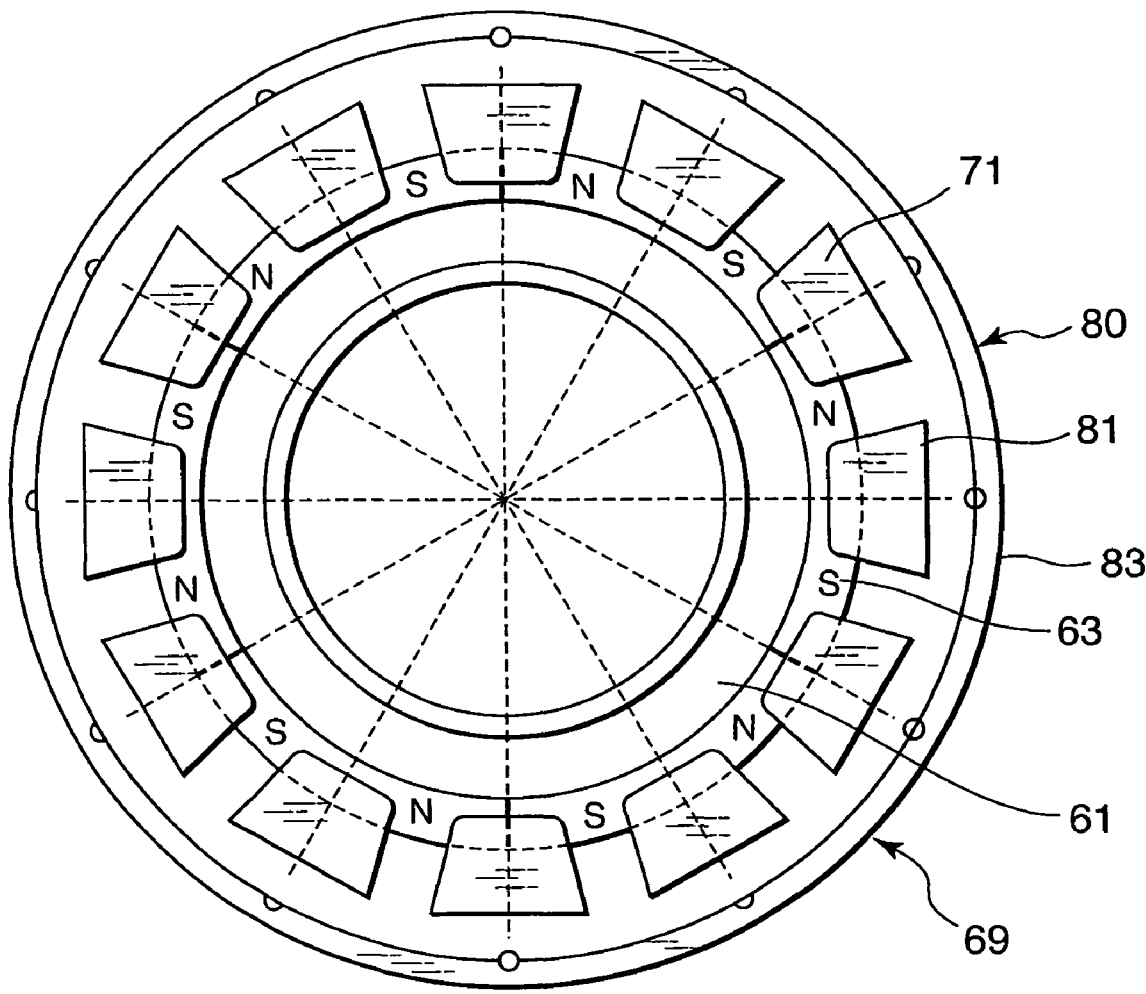
FIG. 4 is a plan view of essential parts of the torque sensor, illustrating the positional relationship between a magnetic force generating part and the rotating magnetic circuit.

Referring to FIG. 4, the magnet ring 63 is formed by six arc-shaped magnets made from a hard magnetic material. Each of the arc-shaped magnets has a tip magnetized as an N-pole and another tip magnetized as an S-pole. The arc-shaped magnets are arranged such that the N-pole of one magnet and the S-pole of an adjacent magnet abut each other. According to this construction, the magnet ring 63 has six N-poles and six S-poles which are disposed alternately along a circle at equal angular intervals.

Referring again to FIG. 2, the back yoke 61 is a cylindrical member formed from a soft magnetic material and press-fitted onto the outer periphery of the input shaft 10. The magnet ring 63 is fixed in advance onto the outer periphery of the lower end of the back yoke 61.

The back yoke 61 functions as a fixing member that fixes the magnet ring 63 onto the input shaft 10 as well as a yoke that transmits magnetic flux between an N-pole and an S-pole which abut each other. By causing the back yoke 61 to contact the upper surface of the magnet ring 63, the magnetic flux of the magnet ring 63 is concentrated on the lower surface of the magnet ring 63.

It is also possible to provide a fixing member to fix the magnet ring 63 onto the input shaft 10 separately from the back yoke, whereby the back yoke is interposed between the fixing member and the magnet ring 63.

The rotating magnetic circuit 69 comprises a first soft magnetic member 70 and a second soft magnetic member 80 for receiving the magnetic flux generated by the magnet ring 63, a fixing member 77 fixed onto the output shaft 20, and a resin-molded body 87 which fixes the first soft magnetic member 70 and the second soft magnetic member 80 onto the fitting member 77.

Referring to FIGS. 3A and 3B, the first soft magnetic member 70 comprises a first magnetic ring 73, six first magnetic columns 72 projecting respectively from the first magnetic ring 73 downward, and first magnetic tips 71 which are formed by bending a lower end portion of each first magnetic columns 72 inward so as to face the lower end face of the magnet ring 63.

The second soft magnetic member 80 comprises a second magnetic ring 83, six second magnetic columns 82 projecting respectively from the second magnetic ring 83, and second magnetic tips 81 which are formed by bending an upper end portion of each second magnetic column 82 inward so as to face the lower end face of the magnet ring 63.

The first magnetic ring 73 and the second magnetic ring 83 are removed from each other in the direction of the rotation axis such that the first magnetic tips 71 and the second magnetic tips 81 are arranged alternately at equal angular intervals on an identical plain which is orthogonal to the rotation axis of the torsion bar 51. The first magnetic ring 73 and the second magnetic ring 83 are formed to have a predetermined width in the radial direction. The first magnetic ring 73 and the second magnetic ring 83 are formed in a continuous ring-shape. It is also possible to form the first magnetic ring 73 and the second magnetic ring 83 into a C-shaped ring having a slit.

Referring again to FIG. 4, the first magnetic tips 71 and the second magnetic tips 81 are disposed in a predetermined rotation position such that radial lines connecting the center of the torsion bar 51 and the center of the respective first magnetic tips 71 and radial lines connecting the center of the torsion bar 51 and the center of the respective second magnetic tips 81 correspond to the border between the N-pole and the S-pole of each of the six arc-shaped magnets forming the magnet ring 63 when the power steering device is in a neutral position in which no torque is exerted on the torsion bar 51.

Referring again to FIGS. 3A and 3B, the first magnetic columns 72 and the second magnetic columns 82 are disposed in parallel with the rotation axis of the torsion bar 51. Each of the first magnetic columns 72 and the second magnetic columns 82 is formed into a flat-plate-shape. When assembled into the rotating magnetic circuit 69, the first magnetic columns 72 and the second magnetic columns 82 form a planar shape of a dodecagon about the center of the torsion bar 51.

It is also possible to form each of the first magnetic columns 72 and the second magnetic columns 82 in a curved shape such that the first magnetic columns 72 and the second magnetic columns 82, when assembled into the rotating magnetic circuit 69, form a cylindrical shape which is coaxial with the torsion bar 51.

The first magnetic columns 72 extend downward from the first magnetic ring 73 and pass along the outer periphery of the magnet ring 63 to reach the first magnetic tips 71 located below the magnet ring 63. A predetermined space is kept between the first magnetic columns 72 and the magnet ring 63 to prevent a magnetic short-circuit therebetween. The second magnetic columns 82 extend upward from the second magnetic ring 83 to reach the second magnetic tips 81. The first magnetic columns 72 and the second magnetic columns 82 therefore extend in opposite directions to reach the first magnetic tips 71 and the second magnetic tips 81, which are located in the same plane.

According to the above construction, the size of the rotating magnetic circuit 69 can be made short in the direction of the rotation axis while preserving enough space between the first magnetic ring 73 and the second magnetic ring 83 to prevent a magnetic short-circuit therebetween.

The first magnetic ring 73, the first magnetic columns 72, and the first magnetic tips 71 are manufactured in advance by performing press-working on a soft magnetic plate material to form a one-piece first soft magnetic member 70. The second magnetic ring 83, the second magnetic columns 82, and the second magnetic tips 81 are also manufactured in advance by performing press working on a soft magnetic plate material to form a one-piece second soft magnetic member 80. It is also possible to manufacture these members by means of metal casting or sintering.

When the first soft magnetic member 70 and the second soft magnetic member 80 are manufactured by means of metal casting or sintering, it is possible to form the first magnetic columns 72 and the second magnetic columns 82 into a block shape that is thicker than the press-formed magnetic columns in the radial direction with respect to the torsion bar 51.

The first soft magnetic member 70 and the second soft magnetic member 80 are preferably made as identical members having an identical shape and size. By reversing the directions of assembling, the two identical members serve as the first soft magnetic member 70 and the second soft magnetic member 80.

It is still possible to form the soft magnetic member 70 and the second soft magnetic member 80 in different shapes. For example, the first soft magnetic member 70 may be formed in a flat shape in which the first magnetic columns 72 are omitted and the first magnetic tips 71 project inward directly from the first magnetic ring 73. In this case, only the second magnetic columns 82 of the second soft magnetic member 80 function to provide a space between the first magnetic ring 73 and the second magnetic ring 83 in the direction of the rotation axis of the torsion bar 51 so as to prevent a magnetic short-circuit between the first magnetic ring 73 and the second magnetic ring 83.

Similarly, the second soft magnetic member 80 may be formed in a flat shape in which the second magnetic columns 82 are omitted and the second magnetic tips 81 project inward directly from the second magnetic ring 83. In this case, only the first magnetic columns 72 provided in the first soft magnetic member 70 function to provide a space between the first magnetic ring 73 and the second magnetic ring 83 in the direction of the rotation axis of the torsion bar 51 so as to prevent a magnetic short-circuit between the first magnetic ring 73 and the second magnetic ring 83.

The fitting member 77 is made from ferrous metal and formed in a cylindrical shape. A resin-molded body 87 is used for integrating the fitting member 77, the first soft magnetic member 70, and the second soft magnetic member 80 into one-piece.

Referring again to FIG. 1, a plurality of holes 29 are formed on the outer periphery of the output shaft 20. The fitting member 77 has a lower end 76 which covers the holes 29 in a state where the rotating magnetic circuit 69 has been press-fitted onto the output shaft 20. Once the rotating magnetic circuit 69 is press fitted onto the output shaft 20, the fitting member 77 is secured onto the output shaft 20 so as not to displace in the axial and rotation directions by driving the corresponding parts of the lower end into the holes 29 using a staking jig.

By thus integrating the fitting member 77, the first soft magnetic member 70, and the second soft magnetic member 80 into one piece via the resin-molded body 87, no magnetic short-circuits occur among the fitting member 77, the first soft magnetic member 70, and the second soft magnetic member 80 even if the fitting member 77 is constructed from a ferrous metal.

It is possible to construct the fitting member 77 from a nonmagnetic material such as aluminum, but constructing the fitting member 77 from a ferrous metal helps to reduce the manufacturing cost of the torque sensor 50.

The resin-molded body 87 is formed as follows. The fitting member 77, the first soft magnetic member 70, and the second soft magnetic member 80 are first disposed in a predetermined die. A molten thermoplastic resin is then funneled into the die. The resin-molded body 87 is obtained by cooling the molten thermoplastic resin thus molded. The material for the resin-molded body 87 is not limited to molten thermoplastic resin, and thermosetting resin or reaction curing resin may be used instead.

Referring again to FIGS. 3A and 3B, the first magnetic ring 73 has a plurality of positioning holes 74 formed at regular angular intervals. The second magnetic ring 83 has a plurality of positioning holes 84 formed at regular angular intervals. When the resin-molded body 87 is molded, the magnetic ring 73 and the second magnetic ring 83 are positioned precisely in the die with respect to the rotation direction by inserting a positioning jig into the positioning holes 74 and 84.

An annular groove 78 is formed on the outer periphery of the fitting member 77 in advance. The fitting member 77 is provided with a plurality of rotation blocking holes 79 opening onto the annular groove 78. When forming the resin-molded body 87, the annular groove 78 and the rotation blocking holes 79 are filled up with the resin, thereby preventing the fitting member 77 from displacing in the axial and rotation directions with respect to the resin-molded body 87.

Referring again to FIG. 2, the die is formed in advance in such a shape that twelve inward depressed portions 88 are formed on the inner periphery of the resin-molded body 87 to accommodate the first magnetic columns 72 and the second magnetic columns 82.

By forming the die in this way, the resin funneled into the die to mold the resin-molded body 87 is prevented by the die from contacting the first magnetic columns 72 and the second magnetic columns 82. Such an arrangement of the die is preferable in preventing internal stress from being generated in the first magnetic columns 72 and the second magnetic columns 82 due to a forming pressure of the resin during the process of solidification and shrinking, or due to thermal expansion or thermal shrinkage of the resin after the resin-molded body 87 is molded.

Internal stress causes the magnetic flux transmitting performance of the first magnetic columns 72 and the second magnetic columns 82 to deteriorate. By forming the die to provide the depressed portions 88, the first magnetic columns 72 and the second magnetic columns 82 can be positioned easily with respect to the die.

The die is formed such that the depressed portions 88 are provided on the outside of the first magnetic columns 72 and the second magnetic columns 82. It is however possible to form the die such that the depressed portions 88 are formed on the inside of the first magnetic columns 72 and the second magnetic columns 82.

The fixed magnetic circuit 90 comprises a first magnetic collecting ring 91 facing the outer periphery of the first magnetic ring 73, a second magnetic collecting ring 92 facing the outer periphery of the second magnetic ring 83, a first magnetic collecting yoke 93 connected to the first magnetic collecting ring 91, and a second magnetic collecting yoke 94 connected to the second magnetic collecting ring 92.

The first magnetic collecting ring 91 is constructed from a soft magnetic material into a C-shaped ring which has a slit 91a. The second magnetic collecting ring 92 is constructed from a soft magnetic material into a C-shaped ring which has a slit 92a. The first magnetic collecting ring 91 and the second magnetic collecting ring 92 are formed in an identical shape. The first magnetic collecting ring 91 and the second magnetic collecting ring 92 are fixed on the inner periphery of the housing 30.

Referring again to FIG. 1, a first annular groove 31 into which the first magnetic collecting ring 91 is fitted and a second annular groove 32 into which the first annular groove 31 is fitted are formed on the inner periphery of the housing 30. The annular grooves 31 and 32 are made into an identical shape and size and the magnetic collecting rings 91,92 have a larger diameter than the diameter of the annular grooves 31, 32. The first magnetic collecting ring 91 therefore narrows the width of the slit 91a when it is fitted into the first annular groove 31. The second magnetic collecting ring 92 also narrows the width of the slit 92a when it is fitted into the second annular groove 32. When the widths of the slits 91a and 92a are narrowed, the effect of the magnetic gap formed by the slits 91a and 92a decreases. The housing 30 is formed from a nonmagnetic metal material such as aluminum.

The depth of the first annular groove 31 is set to be smaller than the thickness of the first magnetic collecting ring 91 in the radial direction. The depth of the second annular groove 32 is set to be smaller than the thickness of the first magnetic collecting ring 92 in the radial direction. As a result, the first magnetic collecting ring 91 projects inward from an inner peripheral surface 38 of the housing 30 in a state where it is fitted into the first annular groove 31. The second magnetic collecting ring 92 projects inward from the inner peripheral surface 38 of the housing 30 in a state where it is fitted into the second annular groove 32.

The first magnetic collecting ring 91 has a central portion with respect to the axial direction which faces the outer periphery of the first magnetic ring 73 at a predetermined gap. The second magnetic collecting ring 92 has a central portion with respect to the axial direction which faces the outer periphery of the second magnetic ring 83.

The first magnetic collecting yoke 93 and the second magnetic collecting yoke 94 are fixed in advance to the interior of a sensor housing 39. By press fitting the sensor housing 39 into a lateral opening of the housing 30, the first magnetic collecting yoke 93 comes into contact with a back portion of the first magnetic collecting ring 91 on the opposite side of the slit 91a and the second magnetic collecting yoke 94 comes into contact with a back portion of the second magnetic collecting ring 92 on the opposite side of the slit 92a.

Referring again to FIG. 2, the first magnetic collecting yoke 93 is formed into a block-shape and has a pair of magnetic collecting projections 93a projecting downward. The second magnetic collecting yoke 94 is formed into a block-shape and has a pair of magnetic collecting projections 94a projecting upward. The pair of the magnetic collecting projections 93a and the pair of the magnetic collecting projections 94a have end faces facing each other on both sides of a pair of magnetic gaps 96.

Referring again to FIG. 1, a magnetic sensor 98 using a hall element is inserted into the pair of the magnetic gaps 96. The magnetic sensor 98 outputs signals representing a magnitude and direction of a magnetic field formed in the magnetic gaps 96 via a signal cable 97. The magnetic sensor 98 may further comprise an amplifying circuit which amplifies the signals generated by the hall element, a circuit for temperature compensation, or a circuit for noise filtering.

When the power steering device is in the neutral position in which no torque is exerted on the torsion bar 51, the first magnetic tips 71 of the first soft magnetic member 70 and the second magnetic tips 81 of the second soft magnetic member 80 face evenly the N-poles and the S-poles of the magnet ring 63, thereby causing a magnetic short circuit between an N-pole and an adjacent S-pole. In this state, the magnetic flux of the magnet ring 63 is not transmitted to the rotating magnetic circuit 69 and the fixed magnetic circuit 90.

When a driver of a vehicle operates the steering wheel, a torque in one direction is input into the torsion bar 51 and the torsion bar 51 undergoes a torsional deformation according to the direction of the input torque.

Providing that the rotating magnetic circuit 69 has rotated clockwise in FIG. 4 with respect to the magnet ring 63 as a result of the torsional deformation of the torsion bar 51, the total area of the first magnetic tips 71 facing the N-poles increases and the total area of the second magnetic tips 81 facing the S-poles increases.

As a result, the magnetic flux generated by the magnet ring 63 is transmitted to the fixed magnetic circuit 90 via the rotating magnetic circuit 69, and the magnetic sensor 98 outputs signals in response to the magnitude and the direction of the magnetic field formed in the magnetic gaps 96.

The magnetic path formed through the rotating magnetic circuit 69 and the fixed magnetic circuit 90 in this state starts from the N-poles of the magnet ring 63 passes through the first magnetic tips 71, the first magnetic columns 72, the first magnetic ring 73, the first magnetic collecting ring 91, the first magnetic collecting yoke 93, the second magnetic collecting yoke 94, the second magnetic collecting ring 92, the second magnetic ring 83, the second magnetic columns 82, and the second magnetic tips 81 to reach the S-poles of the magnet ring 63.

The torsion bar 51 undergoes a torsional deformation in response to the input torque. As the difference in the N-pole facing area and the S-pole facing area of the first magnetic tips 71 and the difference in the S-pole facing area and the N-pole facing area of the second magnetic tips 81 increases, the magnitude of the magnetic field formed in the magnetic gaps 96 increases and the output signals from the magnetic sensor 98 varies accordingly.

It should be noted that the number of the poles of the magnet ring 63 can be set arbitrarily as long as it is equal to or greater than two. Providing that the facing area of the first soft magnetic member 70 to the magnet ring 63 is identical to the facing area of the second soft magnetic member 80 to the magnet ring 63, the magnetic flux density transmitted to the magnetic sensor 98 is increased by increasing the number of poles of the magnet ring 63.

The first magnetic ring 73 and the second magnetic ring 83 must be spaced each other in the direction of the rotation axis so as prevent a magnetic short-circuit therebetween.

In the torque sensor according to the aforesaid prior art, both the first magnetic ring and the second magnetic ring are located under the magnet and both the first magnetic columns and the second magnetic columns are formed upward toward the first magnetic tips and the second magnetic tips, respectively. As a result, the first magnetic columns can be made short, but the second magnetic columns become inevitably long. Therefore it is difficult to manufacture the second soft magnetic member comprising the second magnetic columns by means of press working.

In the torque sensor 50 according to this invention, the magnet ring 63 is disposed between the first magnetic ring 73 and the second magnetic ring 83 with respect to the direction of the rotation axis and the first magnetic columns 72 and the second magnetic columns 82 are arranged to project in opposite directions.

More specifically, the first magnetic columns 72 project downward from the first magnetic ring 73 pass on the outside of the magnetic force generating part 60 along the direction of the rotation axis to reach the first magnetic tips 71. The second magnetic columns 82 project upward from the second magnetic ring 83 so as to approach the magnetic force generating part 60 along the direction of the rotation axis to reach the second magnetic tips 81.

According to the above construction of the rotating magnetic circuit 69, the length of the first magnetic columns 72 and the length of the second magnetic columns 82 in the direction of the rotation axis can be made shorter with respect to the distance between the first magnetic ring 73 and the second magnetic ring 83. By shortening the length of the first magnetic columns 72 and the length of the second magnetic columns 82 in this way, the first soft magnetic member 70 and the second soft magnetic member 80 can be manufactured by means of press working.

In the housing 30, the first magnetic collecting ring 91 and the second magnetic collecting ring 92 have to be secured in the first annular groove 31 and the second annular groove 32, respectively, so as not to move in a circumferential direction or a radial direction.

Figure 9C:
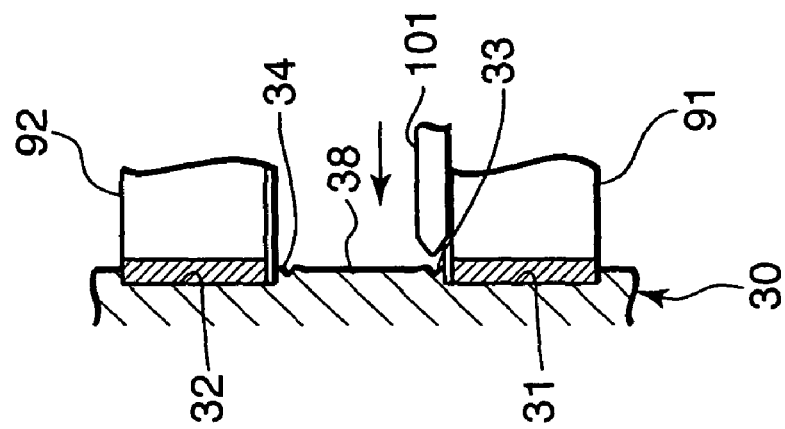
FIGS. 9A-9C are enlarged sectional views of essential parts of the staking device and the housing, illustrating a process of forming the staking parts.
Figure 9B:
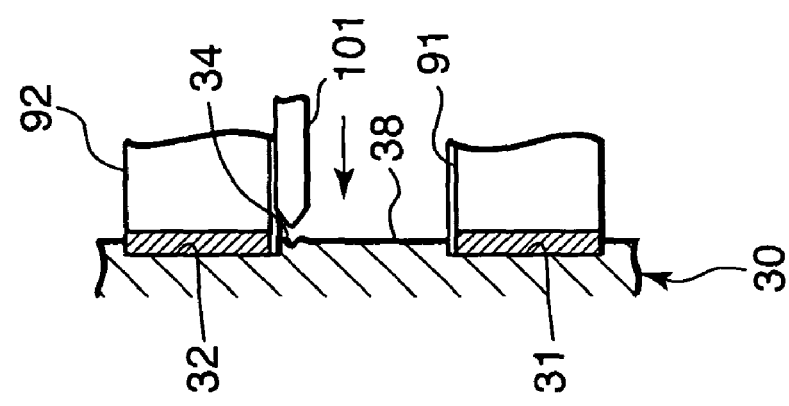
Figure 9A:
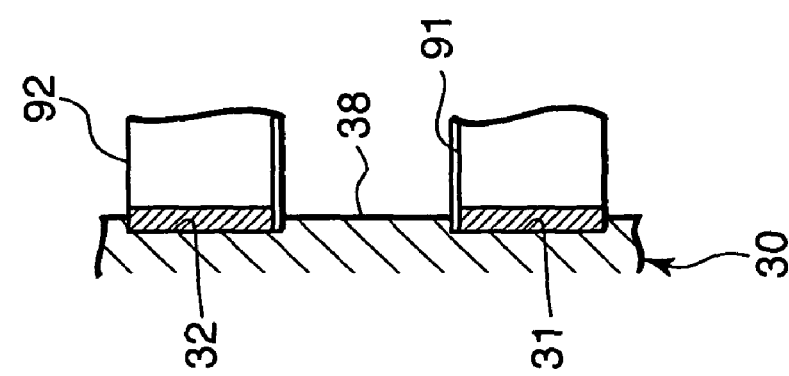

Referring to FIGS. 9A-9C, a principle of this securing process will be described.

Referring first to FIG. 9A, when the first magnetic collecting ring 91 and the second magnetic collecting ring 92 are fitted into the first annular groove 31 and the second annular groove 32, respectively, a fitting clearance exists between the first magnetic collecting ring 91 and side walls of the first annular groove 31 and between the second magnetic collecting ring 92 and side walls of the second annular groove 32. In this state, the first magnetic collecting ring 91 and the second magnetic collecting ring 92 are not secured in the first and second annular grooves 31, 32 and can move in the radial and circumferential directions.

Referring to FIG. 9B, after the second magnetic collecting ring 92 is fitted into the second annular groove 32, staking parts 34 are formed on the inner peripheral surface 38 of the housing 30 along the second annular groove 32 by driving punches 101 into the inner peripheral surface 38 of the housing 30 on one side of the annular groove 32.

Referring to FIG. 9C, after the first magnetic collecting ring 91 is fitted into the first annular groove 31, staking parts 33 are formed on the inner periphery of the housing 30 along the first annular groove 31 by driving the punches 101 into the inner peripheral surface 38 of the housing 30 on one side of the annular groove 31.

According to this staking process, looseness is eliminated in the magnetic collecting rings 91, 92 in the annular grooves 32, 32 is eliminated and the circumferential and radial displacement of the first magnetic collecting ring 91 and the second magnetic collecting ring 92 with respect to the housing 30 is also prevented.

Next, a staking device 100 for forming the staking parts 33 and 34 according to this invention will be described.

Figure 5A:
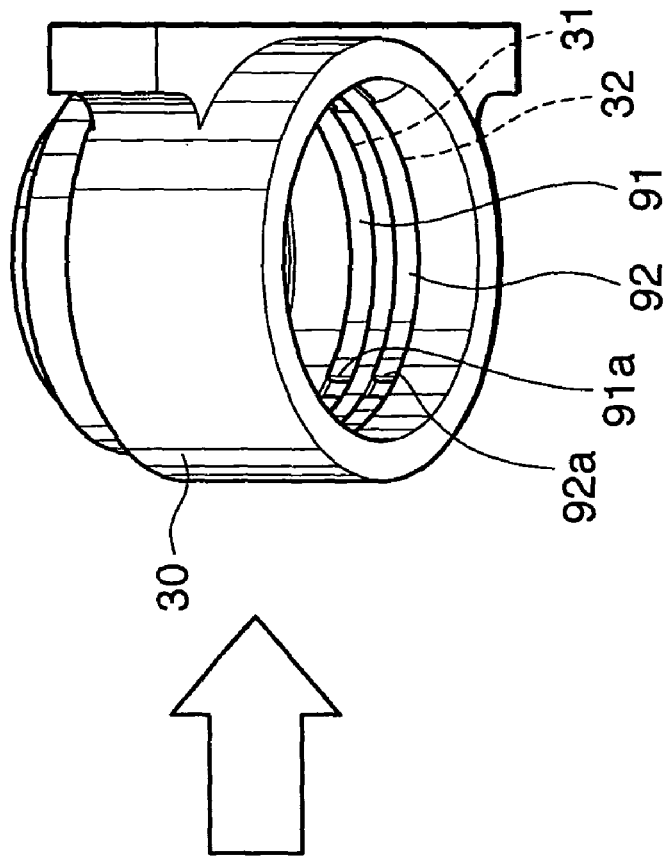
FIGS. 5A and 5B are perspective views of a fixed magnetic circuit according to this invention in a broken-down state and a built-up state.
Figure 5B:
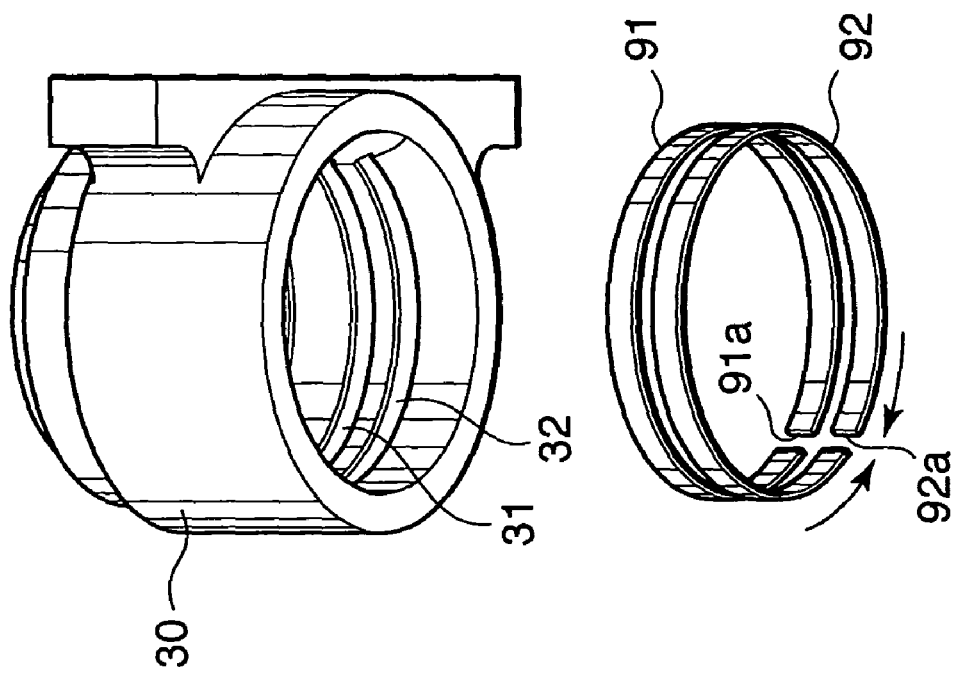

Referring to FIGS. 5A and 5B, when the torque sensor 50 is assembled, the first magnetic collecting ring 91 is fitted into the first annular groove 31 and the second magnetic collecting ring 92 is fitted into the second annular groove 32.

Figure 6:
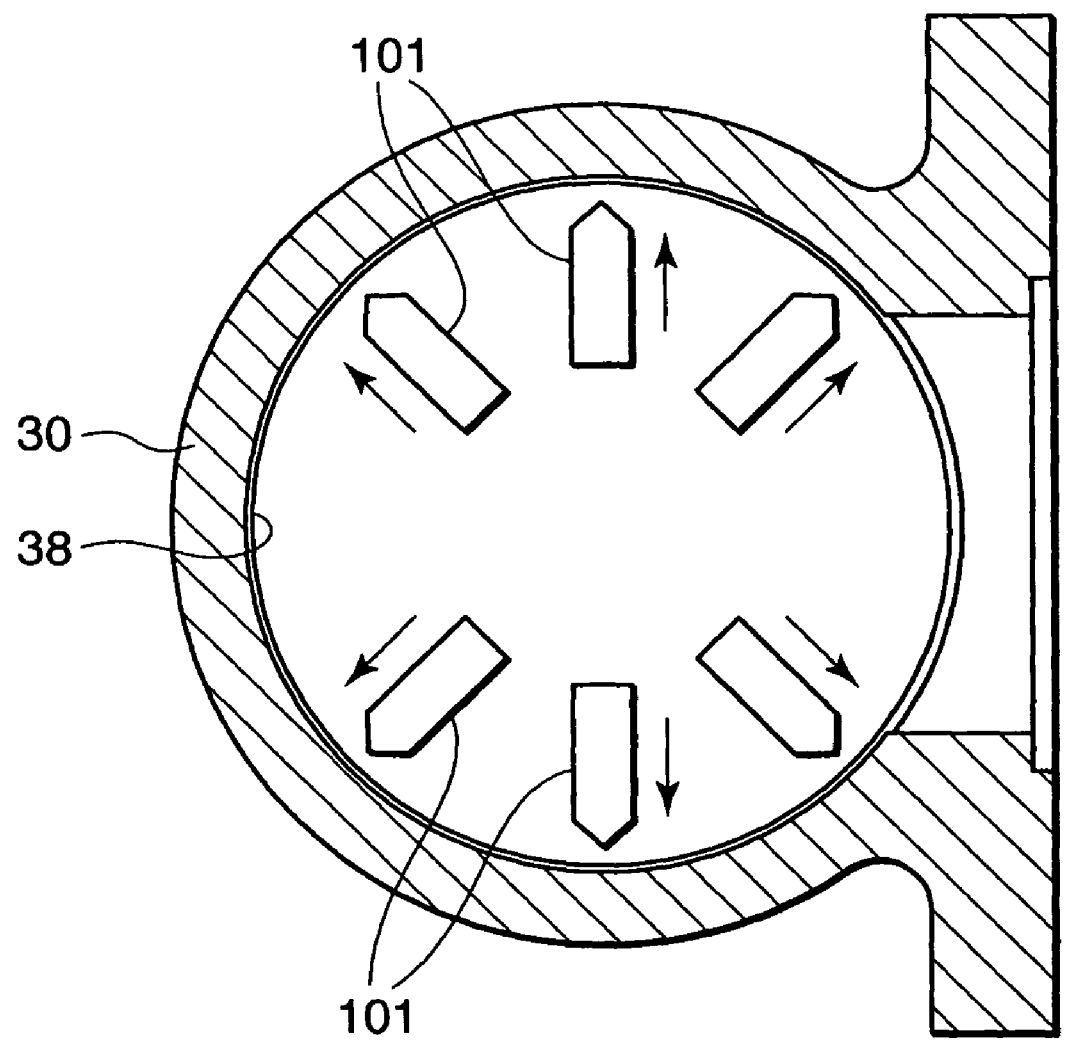
FIG. 6 is a horizontal sectional view of a housing of the power steering device.
Figure 7:
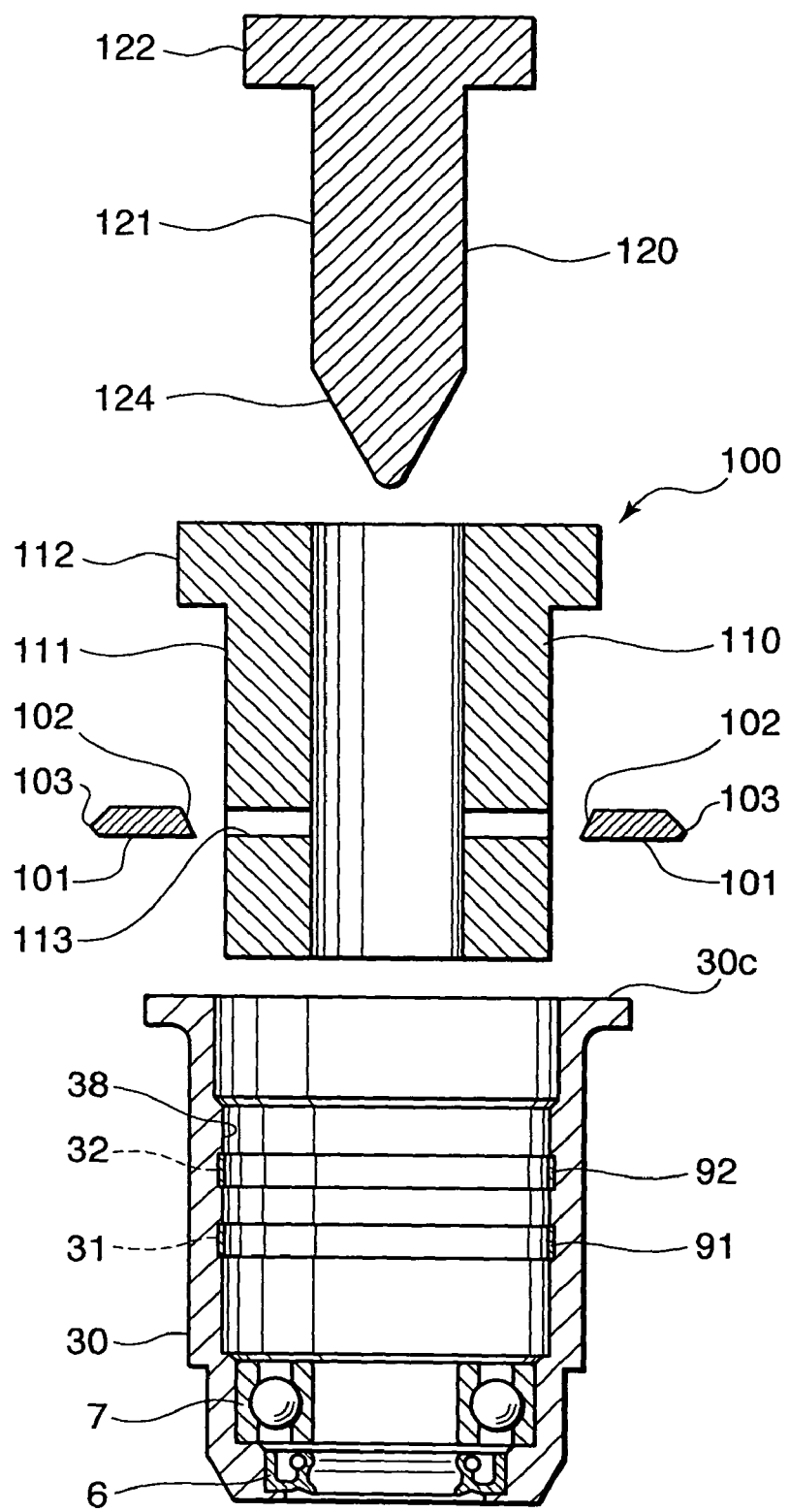
FIG. 7 is an exploded vertical sectional view of the housing and a staking device according to this invention.
Figure 8A:
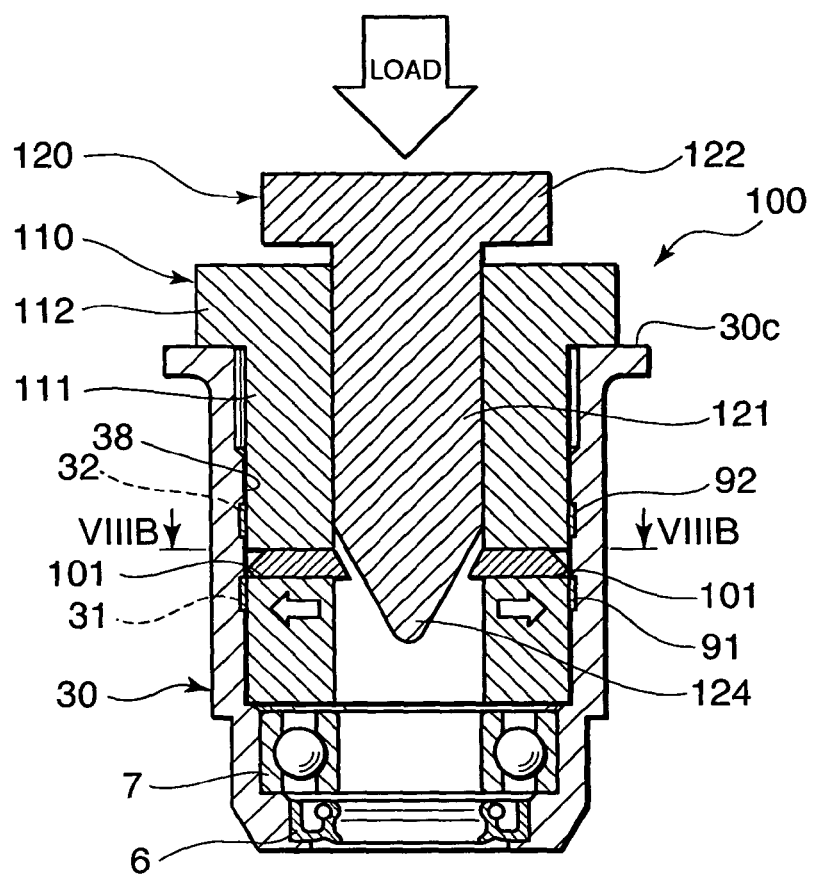
FIGS. 8A and 8B are a horizontal sectional view and a vertical sectional view of the staking device and the housing.
Figure 8B:
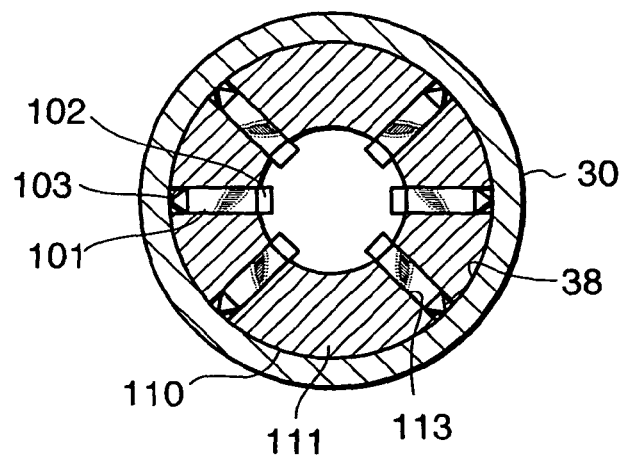

Referring to FIG. 6, the punches 101 are driven into the inner peripheral surface 38 of the housing 30 on one side of the first annular groove 31 and on one side of the second annular groove 32 using a staking device 100 shown in FIG. 7, and FIGS. 8A and 8B.

Referring to FIG. 7, the staking device 100 comprises a cylindrical guide 110 and a pressing jig 120.

The guide 110 is inserted into the inner peripheral surface 38 of the housing 30. It should be noted that the housing 30 in the figure is inverted in a state where no other members such as the output shaft 20, the input shaft 10, the magnetic force generating part 60, and the rotating magnetic circuit 69 are assembled.

The guide 110 comprises a cylindrical part 111 which slides the inner peripheral surface 38 of the housing 30, and a flange part 112 which contacts an end face 30c of the housing 30. It should be noted that the cylindrical part 111 may be formed to have a polygonal cross section instead of a circular cross section.

The guide 110 has six lateral holes 113 which are formed horizontally in a radial direction in the cylindrical part 111 so as to connect the outside and the inside of the guide 110. The punches 101 are accommodated in the respective lateral holes 113.

The lateral holes 113 are formed to have a rectangular cross section, and the punches 101 accommodated in the lateral holes 113 also have a rectangular cross section so as not to rotate within the lateral holes 113. However, the cross-sectional shape of the lateral holes 113 and that of the punches 101 are not limited to a rectangular shape.

The punches 101 are formed in a rod-shape having two tips. A tapered face 102 facing obliquely upward is formed on a tip which is directed toward a center of the guide 110. A wedge 103 is formed on another tip which is directed outward.

The pressing jig 120 is inserted into the guide 110 to drive the punches 101 radially outward. The pressing jig 120 comprises a columnar portion 121 having a cylindrical outer shape that fits the inner periphery of the guide 110, a flange portion 122 formed at the top end of the columnar portion 121, and a tip cam portion 124 formed into a conical shape at a lower lend of the columnar portion 121. By inserting the pressure jig 120 into the guide 110 until the flange portion 122 comes into contact with the flange part 112 of the guide 110, the tip cam portion 124 contacts the tapered face 102 of the punches 101 and drives it outward.

The cross-sectional shape of the columnar portion 121 is not limited to a circular shape and may be polygonal as long as it fits the inner periphery of the cylindrical part 111 of the guide 110. The tip cam portion 124 is not limited to a conical shape and can be formed to have a polygonal cross-section. When the tip cam portion 124 is formed in a conical shape, the contact between the tip cam portion 124 and the punches 101 is line contact, but when the tip cam portion 124 is formed to have a polygonal cross-section, the contact between the tip cam portion 124 and the punches 101 may be area contact, thereby increasing abrasion resistance of the tip cam portion 124 and the punches 101.

Referring to FIGS. 8A and 8B, when the pressing jig 120 is pushed into the guide 110 until the flange portion 122 comes into contact with the flange part 112 of the guide 110, the tip cam portion 124 of the pressing jig 120 which is in contact with the tapered face 102 of the punches 101 pushes the punches 101 outward. Each punch 101 is thereby driven in a radial direction as shown by the arrows in FIG. 6 such that the wedge 103 projects from the outer periphery of the guide 110 by a predetermined length and is driven into the inner peripheral surface 38 of the housing 30.

Referring to FIGS. 10A and 10B, the guide 110 is first inserted into the housing 30 in a state where a spacer 130 is placed on the end face 30c of the housing 30. The pressing jig 120 is then inserted into the guide 110 and pressed downward until the flange portion 122 comes into contact with the flange part 112. The punches 101 are then driven by the tip cam portion 124 into the inner peripheral surface 38 of the housing to form the staking parts 34 on the lower side of the second annular groove 32, as shown in FIG. 9B.

The staking parts 34 are deformed upward so as to eliminate the fitting clearance between the second magnetic collecting ring 92 and the side walls of the second annular groove 32. Since the thickness of the second magnetic collecting ring 92 is greater than the depth of the second annular groove 32, the staking parts 34 do not project inward beyond the inner periphery of the second magnetic collecting ring 92, and therefore the staking parts 34 do not affect the magnetic flux transmitted between the second magnetic ring 83 and the second magnetic collecting ring 92.

After securing the second magnetic collecting ring 92 into the second annular groove 32, the guide 110 and the spacer 130 are removed from the housing 30 and only the guide 110 is inserted again into the housing 30. In this state, the pressing jig 120 is pressed downward again until the flange portion 122 comes into contact with the flange part 112. The punches 101 are then driven by the tip cam portion 124 into the inner peripheral surface 38 of the housing 30 and form the staking parts 33 on the upper side of the first annular groove 31, as shown in FIG. 9C.

The staking parts 33 are deformed downward so as to eliminate the fitting clearance between the first magnetic collecting ring 91 and the side walls of the first annular groove 31. Since the thickness of the first magnetic collecting ring 91 is greater than the depth of the first annular groove 31, the staking parts 33 do not project inward beyond the inner periphery of the first magnetic collecting ring 91, and therefore the staking parts 33 do not affect the magnetic flux transmitted between the first magnetic ring 73 and the first magnetic collecting ring 91.

Six staking parts 33 and six staking parts 34 are thus formed to secure the first and second magnetic collecting rings 91, 92 in the first and second annular grooves 31, 32, respectively.

The staking parts 33 and 34 formed in this way do not generate large stress in the magnetic collecting rings 91, 92.

According to this invention, therefore, the magnetic collecting rings 91, 92 are firmly secured in the annular grooves 31, 32 without causing the magnetic flux collecting performance of the magnetic collecting rings 91, 92 to deteriorate.

Figure 11:
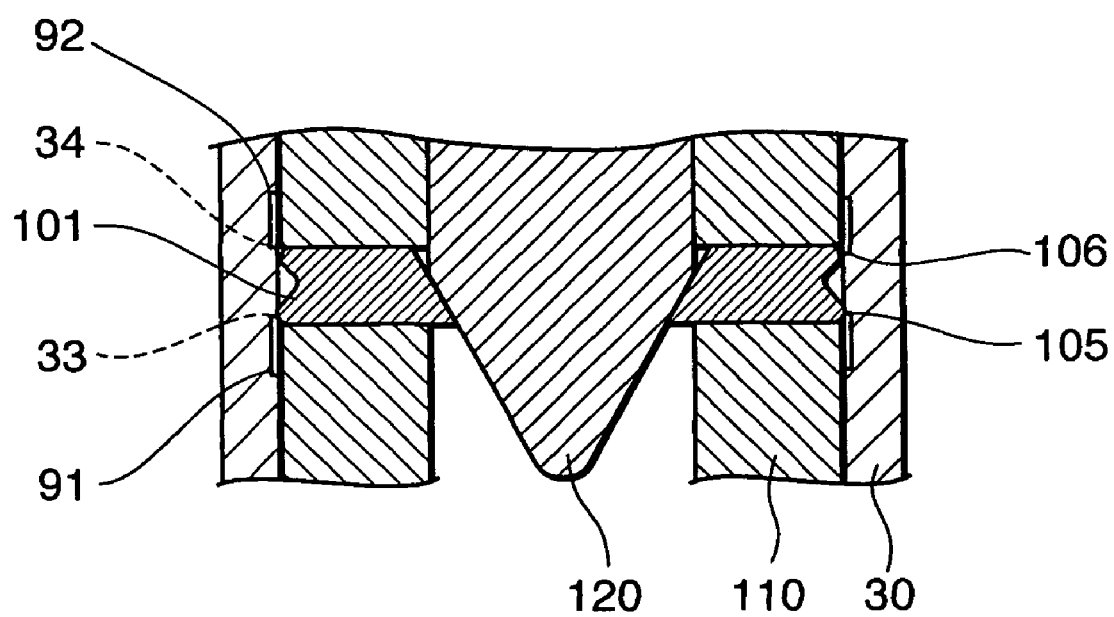
FIG. 11 is a vertical sectional view of essential parts of a staking device according to another embodiment of this invention.

Referring to FIG. 11, another embodiment of this invention with respect to the staking device will be described.

In this embodiment, only the shape of the punches 101 differs from the first embodiment. Specifically, each punch 101 comprises a pair of wedges 105 and 106 instead of the single wedge 103 of the first embodiment.

The distance between the wedges 105 and 106 are set to be equal to the distance between the staking parts 34 and 33.

The staking device 100 according to this embodiment is applied only once in the state shown in FIG. 10B without gripping the spacer 130 between the ends face 30c of the housing 30 and the flange part 112 of the guide 110. Since each of the punches 101 has the pair of the wedges 105 and 106 on its outer tip, the staking parts 34 and 33 are formed simultaneously by driving the punches 101 into the inner peripheral surface 38 of the housing 30. According to this embodiment, therefore, the staking process of the staking parts 33, 34 is minimized.

As another embodiment, the punch 101 may be driven into the inner peripheral surface 38 of the housing 30 in the vicinity of the slits 91a and 92a so as to form staking parts which engage with the first and second magnetic collecting rings 91, 92 on both sides of the slits 91a, 92a. The staking parts thus formed prevent the circumferential and radial displacement of the first and second magnetic collecting rings 91, 92.

As a further embodiment, the staking device 100 may comprise a roller which rolls on the inner peripheral surface 38 of the housing 30 while the staking part is generated.

When the housing 30 is formed from a resin, the first and second magnetic collecting rings 91, 92 may be secured to the housing 30 by means of heat staking.

The contents of Tokugan 2008-091838, with a filing date of Mar. 31, 2008 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, application of the torque sensor according to this invention is not limited to a power steering device for a vehicle. It is widely applicable for the detection of a torque acting between relatively rotating objects connected by a torsion bar.

What is claimed is:

1. A torque sensor comprising:
    a housing having an inner peripheral surface;
    a torsion bar inserted into the housing, the torsion bar having a rotation axis;
    a magnetic force generating part which rotates together with an end of the torsion bar while generating a magnetic flux in a direction of the rotation axis;
    a rotating magnetic circuit which rotates together with another end of the torsion bar;
    an annular groove formed on the inner peripheral surface of the housing to surround the rotating magnetic circuit;
    a magnetic collecting ring fitted into the annular groove, the rotating magnetic circuit transmitting the magnetic flux generated by the magnetic force generating part to the magnetic collecting ring in accordance with relative rotation positions of the magnetic force generating part and the rotating magnetic circuit;
    a staking part formed on the inner peripheral surface of the housing in the vicinity of the annular groove so as to fix the magnetic collecting ring into the annular groove; and
    a magnetic sensor which detects a magnetic flux density in the magnetic collecting ring.

2. The torque sensor as defined in claim 1, wherein the staking part comprises the inner peripheral surface of the housing, which is deformed towards the interior of the annular groove.

3. The torque sensor as defined in claim 1, wherein the magnetic collecting ring comprises a C-shaped ring that has a slit, the C-shaped ring having a greater diameter than the annular groove and decreases in the diameter when fitted into the annular groove.

4. The torque sensor as defined in claim 3, wherein the staking part comprises the inner peripheral surface of the housing which is deformed to engage with the C-shaped ring on both sides of the slit.

5. The torque sensor as defined in claim 1, wherein the rotating magnetic circuit comprises a pair of magnetic rings disposed in offset positions along the rotation axis, the magnetic collecting ring comprises a pair of magnetic collecting rings disposed to face the outer periphery of the pair of the magnetic rings, and the magnetic sensor comprises a sensor that detects a magnetic flux density flowing between the pair of the magnetic collecting rings.

6. The torque sensor as defined in claim 1, wherein the rotating magnetic circuit comprises a first soft magnetic member and a second soft magnetic member, the first soft magnetic member comprising a first magnetic ring disposed around the torsion bar, a first magnetic tip disposed to face the magnetic force generating part in a direction of the rotation axis, and a first magnetic column connecting the first magnetic tip magnetically to the first magnetic ring, and the second soft magnetic member comprising a second magnetic ring disposed around the torsion bar in an offset position from the first magnetic ring in the direction of the rotation axis, a second magnetic tip disposed such that the second magnetic tip and the first magnetic tip are disposed on an identical plane orthogonal to the rotation axis, and a second magnetic column connecting the second magnetic tips magnetically to the second magnetic ring.

7. A manufacturing method of a torque sensor comprising a housing having an inner peripheral surface, a torsion bar inserted into the housing, the torsion bar having an rotation axis, a magnetic force generating part which rotates together with an end of the torsion bar while generating a magnetic flux in a direction of the rotation axis, a rotating magnetic circuit which rotates together with another end of the torsion bar, a magnetic collecting ring fitted into the annular groove, the rotating magnetic circuit transmitting the magnetic flux generated by the magnetic force generating part to the magnetic collecting ring in accordance with a relative rotation positions of the magnetic force generating part and the rotating magnetic circuit, and a magnetic sensor which detects a magnetic flux density in the magnetic collecting ring, the method comprising the steps of:

forming an annular groove on the inner peripheral surface of the housing in the vicinity of the rotating magnetic circuit;

fitting the magnetic collecting ring into the annular groove; and forming a staking part on the inner peripheral surface of the housing in the vicinity of the annular groove to fix the magnetic collecting ring into the annular groove.

8. The manufacturing method of the torque sensor as defined in claim 7, wherein the step of forming the staking part comprises a step of inserting a cylindrical guide into the housing, the guide having a hole in a radial direction into which a punch is fitted, and a step of inserting a pressing jig into the guide so as to drive the punch radially outward.

9. The manufacturing method of the torque sensor as defined in claim 8, wherein the pressing jig has a wedge which, when the pressing jig is pushed into the guide, drives the punch laterally outward.

10. The manufacturing method of the torque sensor as defined in claim 7, wherein the magnetic collecting ring comprises a pair of parallel magnetic collecting rings disposed in a pair of annular grooves formed on the inner peripheral surface of the housing in the vicinity of the rotating magnetic circuit, the pair of parallel magnetic collecting rings being offset from each other in a direction of the rotation axis, and the punch comprises a pair of wedges which can simultaneously form staking parts to fix the pair of the magnetic collecting rings into the pair of the annular grooves, respectively.

* * * * *